US006414085B1

(12) United States Patent
Karas et al.

(10) Patent No.: US 6,414,085 B1
(45) Date of Patent: Jul. 2, 2002

(54) POLYESTER RESINS BASED ON TEREPHTHALIC ACID AND 2-METHYL-1,3-PROPANEDIOL AND PROCESSES FOR THE PREPARATION THEREOF

(75) Inventors: Lawrence J. Karas, West Chester, PA (US); Paul M. Puckett, Lake Jackson, TX (US)

(73) Assignee: Arco Chemical Technology, L.P., Greenville, DE (US)

( * ) Notice: Subject to any disclaimer, the term of this patent is extended or adjusted under 35 U.S.C. 154(b) by 0 days.

(21) Appl. No.: 09/721,424

(22) Filed: Nov. 22, 2000

(51) Int. Cl.⁷ ................................................ C08L 67/06
(52) U.S. Cl. ....................... 525/168; 528/302; 528/306; 528/308; 528/308.6; 525/445
(58) Field of Search .................. 528/302, 306, 528/308, 308.6; 525/168, 445

(56) References Cited

U.S. PATENT DOCUMENTS

| | | |
|---|---|---|
| 4,369,282 A | 1/1983 | Campbell |
| 4,381,379 A | 4/1983 | Toga et al. |
| 4,396,746 A | 8/1983 | Toga |
| 4,415,727 A | 11/1983 | Toga et al. |
| 4,436,896 A | 3/1984 | Okamoto et al. |
| 5,373,058 A | 12/1994 | Hager et al. |
| 5,380,816 A | 1/1995 | Sullivan |
| 5,521,232 A | 5/1996 | Gynn et al. |
| 5,614,299 A | 3/1997 | Yamamoto et al. |
| 5,723,562 A | 3/1998 | Stein |
| 5,770,653 A | 6/1998 | Matsukawa et al. |
| 5,880,225 A | 3/1999 | Yang et al. |
| 5,916,677 A | 6/1999 | Chen et al. |
| 6,107,446 A | 8/2000 | Luza et al. |

*Primary Examiner*—Samuel A. Acquah
(74) *Attorney, Agent, or Firm*—Brooks & Kushman P.C.

(57) ABSTRACT

Unsaturated terephthalate-based polyester resins (UPR) based on 2-methyl-1,3-propanediol, a saturated dicarboxylic acid or derivative thereof, and an unsaturated dicarboxylic acid or derivative thereof be prepared without use of a catalyst in reasonable cycle times. UPR based on these monomers exhibit exceptional solubility in styrene, and are thus useful in polyester molding resins.

31 Claims, No Drawings

POLYESTER RESINS BASED ON TEREPHTHALIC ACID AND 2-METHYL-1,3-PROPANEDIOL AND PROCESSES FOR THE PREPARATION THEREOF

TECHNICAL FIELD

The present invention pertains to the field of unsaturated polyester resins and to molding compositions containing these unsaturated polyester resins and a copolymerizable unsaturated monomer.

BACKGROUND ART

Unsaturated polyester resins ("UPR") are well known items of commerce with a myriad of uses, for example as matrix resins for fiber reinforced composites, fillers for autobody repair, molding of plastic parts, and in sheet molding compound (SMC). Unsaturated polyester resins have a polyester backbone which incorporates or is modified to contain reactive ethylenic unsaturation. These unsaturated polyester resins are most often admixed with styrene or other unsaturated co-monomers such as alkylmethacrylates to produce the ultimate molding resin, which is also frequently termed an unsaturated polyester resin despite the presence of considerable amounts of styrene. In the present invention, the term "UPR" refers to the unsaturated polyester resin only, i.e., the styrene-free resin. UPR should be distinguished from thermoplastic polyester molding resins prepared from saturated monomers, which are moldable solids useful for polyester fibers, sheet goods, and beverage bottles.

The majority of UPR are derived from a "saturated" aromatic dicarboxylic acid or acid anhydride containing no ethylenic unsaturation, i.e., isophathalic acid and/or phthalic anhydride; a glycol or mixture of glycols, i.e., ethylene glycol, diethylene glycol, propylene glycol, dipropylene glycol, or neopentylglycol; and a fumarate precursor, i.e., maleic anhydride. The choice of diol is often important for the end use. For example, UPR prepared with propylene glycol tend to have both lower water absorbtion properties as well as higher hydrolytic stability than those prepared from primary diols such as ethylene glycol and diethylene glycol.

A variety of processes have been proposed for manufacture of UPR. However, the conventional process involves a first reaction of the aromatic dicarboxylic acid with glycol to produce a diol-terminated polyester oligomer of the desired molecular weight, followed by reaction with maleic anhydride ("two stage process"). One stage reactions are not generally possible due to poor resin performance. The second stage is typically concluded by allowing sufficient time at elevated temperatures to convert maleate unsaturation to fumarate unsaturation. An example of UPR production may be found in U.S. Pat. No. 5,880,225, herein incorporated by reference.

As in other industrial processes, numerous factors are important in dictating the economics and performance of UPR. For example the process time in preparing UPR is desirably as short as possible. From both a cost, and performance standpoint, would be highly desirable to employ terephthalic acid as the aromatic dicarboxylic acid in UPR production, as terephthalic acid has significant economic benefits due to its widespread use in manufacture of polyethylene terephthalate (PET), and also exhibits excellent high temperature characteristics. However, UPR based on terephthalic acid, although commercially available, constitute only a very small portion of commercial UPR despite these cost and performance benefits. Several factors dictate this result.

First, polyesterification when employing terephthalic acid is very slow. Thus, high temperatures, which require pressurized reactors, and the use of transition metal esterification catalysts are generally necessary. The use of catalysts such as tin and transition metal compounds are particularly effective in lowering reaction time and temperature; however, the UPR product generally exhibits loss of corrosion resistance due to the residual catalyst content. Reaction at high temperatures over extended periods of time frequently leads to highly colored products, particularly in the presence of metal salts, and the pressurized reactors necessary for high temperature production are expensive both from capital and operational standpoints. Second, terephthalic acid is insoluble in the starting glycol, especially when propylene glycol is used, and is only sparingly soluble in the initially produced polyester oligomers as well. This insolubility is well documented. For example, in the production of saturated polyesters for polyester fibers, as disclosed in U.S. Pat. No. 5,916,677, the starting terephthalic acid and diol are slurried together.

Of the diols which have been used in polyester production, ethylene and propylene glycols have been the most dominant. Diethylene glycol is also used to a considerable extent. Neopentyl glycol, like ethylene glycol and diethylene glycol is a primary glycol, hence it has also been used in polyesters. Diols such as 1,4-cyclohexanediol and particularly cis- and trans 1,4-cyclohexanedimethanol have been touted as being suitable for high temperature and high strength saturated polyester molding resins. However, these diols are not inexpensive, thus limiting their use. Moreover, terephthalate-based polyesters prepared from diols such as ethylene glycol, diethylene glycol, and neopentyl glycol are generally not sufficiently soluble in styrene to be useful as casting, sheet molding, and matrix resins for fiber reinforced products.

One diol which has seen only limited use is 2-methyl-1,3-propanediol. This diol is commercially available as MPDiol® from the Lyondell Chemical Company, and has been suggested for use as a diol in preparing thermoplastic (saturated) polyester resins. In U.S. Pat. No. 4,381,379, mixtures of 2-methyl-1,3-propanediol and polytetramethylene ether glycol ("PTMEG") are suggested for use with terephthalic acid as a thermoplastic molding resin. However, the patentees caution against use of more than 25% by weight of 2-methyl-1,3-propanediol/terephthalate moieties. U.S. Pat. No. 4,415,727 teaches modified polyethylene-terephthalate thermoplastic molding resins prepared from a glycol mixture of ethylene glycol and up to 15 mol percent 2-methyl-1,3-propanediol. The preparation requires in excess of 8 hours even when catalyzed by tetralkoxytitanium compounds. U.S. Pat. No. 4,436,896 similarly prepared thermoplastic terpolyesters from diol mixtures of two low molecular weight diols, 2-methyl-1,3-propanediol and 1,6-hexanediol, and a high molecular weight polyoxyalkylene ether glycol. U.S. Pat. No. 5,380,816 discloses linear polyester diols prepared by the monobutyl tin oxide catalyzed reaction of 2-methyl-1,3-propanediol and mixtures of aromatic and aliphatic dicarboxylic acids, for coatings employing aminoplast crosslinking resins. U.S. Pat. Nos. 4,396,746 and 5,614,299 both disclose thermoplastic polyester molding resins employing, as the diol component, mixtures of 2-methyl-1,3-propanediol and cyclohexanedimethanol.

Seldom has 2-methyl-1,3-propanediol been used in terephthalate-based unsaturated polyester resins, and then only in minor amounts, and always in catalyzed reactions. For example, U.S. Pat. No. 5,373,058 employs mixtures of 2-methyl-1,3-propanediol and 40 mol percent ethylene glycol in a catalyzed polyesterification to produce an intermediate acid-functional oligomer which is then reacted with glycidylmethacrylate to produce a methacrylate-terminated polyester. Addition of styrene and considerable quantities of low profile additives is said to provide sheet molding compound having low shrinkage. However, glycidyl methacrylate is an expensive component. The Lyondell Chemical Co. and the former ARCO Chemical Co. have touted MPDiol™ for use in unsaturated polyesters prepared by the conventional, catalyzed esterification of phthalic anhydride and isophthalic acid, for many years. However, these aromatic dicarboxylic acids are much more reactive than terephthalic acid.

DISCLOSURE OF INVENTION

It would be desirable to produce terephthalate-based UPR in short cycle times, but without employing a catalyst. It would be further desirable to prepare UPR in a one pot process, where aromatic dicarboxylic acid, glycol, and unsaturated dicarboxylic acid anhydride are simultaneously present. It would be further desirable to prepare UPR which exhibit enhanced styrene solubility based on terephthalic acid. These and other objects are achieved by the use of 2-methyl-1,3-propanediol as a most major fraction of glycol in an uncatalyzed polyesterification reaction.

BEST MODE FOR CARRYING OUT THE INVENTION

The terephthalate-based UPR of the present invention are prepared by the esterification and/or transesterification reaction of at least one aromatic dicarboxylic acid component, this component containing at least 25 mol percent of terephthalic acid or an esterifiable or transesterifiable derivative thereof, at least one aliphatically unsaturated dicarboxylic acid or derivative thereof, and a glycol component containing at least 65% mol percent of 2-methyl-1,3-propanediol.

Thus, in the present invention, the glycol component comprises a substantial majority, and most preferably, exclusively 2-methyl-1,3-propanediol. It has been surprisingly discovered that use of this diol results in numerous advantages in production of UPR based on terephthalic acid, including manufacture at reasonable cycle time in the absence of a catalyst, the availability of a one-pot process for terephthalate-based UPR resins; and the production of terephthalate-based UPR resins of enhanced styrene solubility.

The aromatic dicarboxylic acids useful in the present application in addition to terephthalic acid, include all the aromatic dicarboxylic acids useful in UPR production. Blends with aliphatic dicarboxylic acids are also possible, particularly when cost effective. Virtually all esterifiable derivatives of these acids may be used, including the anhydrides, the acid chlorides, the carboxylic acids themselves, and the lower esters or half esters or mixed (chloride-esters) of these. These acids, anhydrides, or derivatives are termed "esterifiable or transesterifiable derivatives" herein. Polyester resins, particularly polyester oligomers, may also be used to supply the aromatic content, whether specially synthesized for this purpose or prepared by digestion of polyester scrap.

Among the aromatic dicarboxylic acids used are, in particular, the mononuclear aromatic dicarboxylic acids or derivatives such as phthalic anhydride and isophthalic acid. However, other aromatic carboxylic acids, or their anhydrides or lower ester derivatives are also useful, i.e., the various naphthalene dicarboxylic acids, and the various dicarboxylic acid-functional aromatic biphenyl, anthryl, phenanthryl, and bis(aryl)organo compounds. The latter include such compounds such as the dicarboxylic acids of organic residues such as diphenylcarbonate, diphenylsulfone, 1,1-dimethyl-1,1-diphenylmethane, and the like. Most preferably the dicarboxylic acids or their derivatives are selected from the group of phthalic acid, terephthalic acid, isophthalic acid, the naphthalene dicarboxylic acids, and the biphenyl dicarboxylic acids, and their esterifiable or transesterifiable derivatives. Most preferably, the aromatic dicarboxylic acids are selected from phthalic acid, isophthalic acid, and terephthalic acid, or mixtures of these. The "saturated" (inclusive of aromatic) dicarboxylic acids must contain minimally 25 mol percent terephthalic acid or a derivative thereof, preferably at least 35 mol percent, more preferably at least 50 mol percent, yet more preferably at least 65 mol percent, and most preferably 85 mol percent or more.

Aliphatic dicarboxylic acids (inclusive of cycloaliphatic dicarboxylic acids) or their derivatives may be used in minor quantity, i.e., up to 25 mol percent based on total saturated dicarboxylic acid, but are not preferred. Examples of aliphatic dicarboxylic acids include butanedioic acid, adipic acid, azelaic acid, 1,8-octanedioic acid, 1,8-octanedicarboxylic acid, 1,4-cyclohexanedicarboxylic acid, 1,2-cyclohexanedicarboxylic acid, 2-methyl-1,4-cyclohexanedicarboxylic acid, 1,12-dodecanedioic acid, and the like. Aromatic dicarboxylic acids or their derivatives are preferably used to the exclusion of aliphatic dicarboxylic acids. When mixtures of aromatic and aliphatic dicarboxylic acids or their derivatives are used, the aliphatic acids or derivatives are used in less than 25 mol percent based on total saturated dicarboxylic acid or derivative, more preferably less than 15 mol percent, and most preferably less than 5 mol percent.

The glycol used in the preparation of the terephthalate-based UPR is 2-methyl-1,3-propanediol. This diol is most preferably used alone, to the exclusion of other diols, and particularly, to the exclusion of the commonly used diols such as ethylene glycol, diethylene glycol, propylene glycol, dipropylene glycol, and neopentylglycol. Most preferably the glycol component consists essentially of 2-methyl-1,3-propane diol or contains minimally 90% of the latter. Where desirable, a small proportion of the total of all hydroxyl-functional compounds, i.e., less than 20 equivalent percent based on total hydroxyl functionality, preferably less than 15 equivalent percent, and most preferably less than 10 equivalent percent, may constitute tri- or higher-hydroxyl-functional compounds, such as glycerine, trimethylolpropane, triethylolpropane, pentaerythritol, sorbitol, etc. Most preferably, no hydroxyl-functional compounds with hydroxyl functionalities of greater than 2 are employed. Small amounts, i.e., less than 20 weight percent based on total glycol or polyol, of polyoxyalkylene glycols or polyols may be used, particularly when added flexibility of the cured resin is desired.

The unsaturated dicarboxylic acid used may be any dicarboxylic acid (or derivative thereof) which has been conventionally used in UPR. By the term "unsaturated dicarboxylic acid" is meant an unsaturated dicarboxylic acid or esterifiable or transesterifiable derivative thereof, including dicarboxylic acid anhydrides, dicarboxylic acid halides, dicarboxylic acid lower alkanol esters, mixed acid chloride esters, and the like.

The unsaturated dicarboxylic acids are preferably maleic acid, fumaric acid, itaconic acid, methylmaleic acid, crotonic acid, and the like, more preferably maleic acid, most preferably in the form of its anhydride, maleic anhydride. In addition to these unsaturated dicarboxylic acids, the present polymers may subsequently or concurrently be modified by reaction with dicyclopentadiene. Diels-Alder reaction products of maleic acid or anhydride with cyclopentadiene or in situ depolymerized dicyclopentadiene may be used as the unsaturated dicarboxylic acid. The maleate and/or fumarate or other unsaturation may be introduced in the form of a carboxylic acid-functional oligomer prepared by reaction of excess unsaturated dicarboxylic acid with glycol, particularly oligomers having a molecular weight below about 500 Da.

In the present invention, the polyesterification may proceed by either a one-pot or two pot method. In the two pot esterification, an initial reaction product may be prepared either by reaction of dicarboxylic acid and glycol, followed by reaction with unsaturated dicarboxylic acid; or by the initial reaction of the unsaturated dicarboxylic acid with the diol, followed by reaction with the dicarboxylic acid. Hybrids of the above procedures are also contemplated, and within the scope of the claims, unless otherwise indicated, for example by preparing hydroxyl-functional or carboxyl-functional oligomers prior to final reaction to the desired compound.

Several processes and process variants may be used to manufacture the UPR of the present invention. All of these methods are "catalyst free" methods, i.e., use of esterification and transesterification catalysts in amounts which are effective to catalyze the polyesterification are avoided. The ability to avoid such catalysts is useful in producing UPR which are more corrosion resistant and which may also be useful for applications where minor quantities of potentially migratory metal catalysts are prohibited, i.e., in the food and medical fields.

In the first process according to the invention, a two stage procedure is used. This procedure may be conducted in multiple vessels, but is preferably conducted in but a single vessel. This process is termed a "one pot, two stage" procedure, regardless of the actual number of vessels used.

In the one pot, two stage procedure, the unsaturated dicarboxylic acid or its derivative are reacted with the 2-methyl-1,3-propanediol glycol component followed by reaction with the unsaturated dicarboxylic acid. The glycol mixture is preferably fed first to the reaction, followed by aromatic acid, which is preferably terephthalic acid. This sequence helps avoid the presence of solid clumps of aromatic acid from forming. With terephthalic acid, a slurry may be initially created; however, unlike reaction mixtures based on other diols, the terephthalic acid is soluble in the polyester oligomers, ultimately forming a homogenous reaction mixture. This mixture, preferably in a 2.1:1 glycol/aromatic acid ratio, is heated at a relatively high temperature, i.e., 220° C., without a catalyst. At this temperature, which is about 20° C. or more higher than traditional polyester synthesis, a pressurized reactor is not necessary. The reaction is facilitated by nitrogen sparging. Production of water generally begins at about 195° C. The amount of nitrogen or other inert gas sparge should be such that water of esterification is efficiently removed. A flow rate of 0.01L/min/Kg to 1L/min/Kg of charge may be used, as well as higher or lower rates. A rate of 0.05L/min/Kg has been proven satisfactory. The water liberated by condensation is found to contain only most minor amounts of diol, for example about 1% 2-methyl-1,3-propanediol. In contrast, when glycols such as ethylene glycol are used, pressurized reactors are generally necessary should the reaction temperature substantially exceed 200° C., and considerable glycol is contained in the water of esterification, requiring further addition of glycol as the reaction proceeds.

Most preferably, the reaction takes place at ambient pressure. However, operation at low positive pressure, i.e. about 15 psig or less, preferably 7 psig or less, and most preferably less than 2 psig, is also possible. At these low but positive pressures, reaction temperatures may be further increased. Avoiding yet higher pressures allows for low cost reactors to be employed. Reaction at pressures below ambient is also possible.

The reaction mixture may be heated until a relatively stable acid number has been achieved, or until a target acid number, based on molar proportions of reactants, has been reached. In the case of 2-methyl-1,3-propanediol and terephthalic acid, for example, the reaction mixture becomes clear after about 8 hours, and after 12 hours, an acid number in the range of 15–25 is reached.

The hydroxyl-terminated oligomer is then cooled, for example to 70–90° C., and maleic anhydride or other unsaturated dicarboxylic acid added. After the initial exothermic reaction, the reaction is again heated to 220° C., and blanketed (rather than sparged) with nitrogen. The ratio of unsaturated acid to charged terephthalic acid is about 1:1, although higher or lower ratios may also be used. Ratios of aromatic acid to unsaturated acid of 0.5 to 1.5, preferably 0.7 to 1.3 are particularly useful. The reaction is held at a sufficiently high temperature, i.e., 200° C. to 220° C. for sufficient time to allow both maleic to fumarate isomerization as well as molecular weight build. For example, a final acid number of 20–25 has been achieved after 12 hours. The product may be collected and used for numerous end uses, but is preferably cooled, a free radical polymerization inhibitor added, and styrene added. Styrene may be added to 20–40% by weight styrene, for example, which facilitates filtration to remove particulates. The fluid product may be further diluted to any styrene concentration.

Unlike prior terephthalate-based UPR, the terephthalate-based UPR produced by the above process exhibit exceptional compatibility with styrene. Also unlike other terephthalate-based UPR, the UPR of the subject invention are produced catalyst free. The somewhat longer cycle time is justified for applications which demand the improved properties due to the presence of terephthalate residues, and/or the improved solubility in styrene, all without the presence of metal catalysts in the final product. However, it should be noted that the cycle time is not overly extended relative to conventional catalyzed polyester synthesis, a very surprising and beneficial result.

The catalyst-free preparation cannot be practiced with other diols. For example, when propylene glycol is employed in lieu of 2-methyl-1,3-propanediol, the first stage reaction takes 45 hours, even with nitrogen sparging, and the second stage takes an additional 50 hours! The product obtained, unlike the comparable 2-methyl-1,3-propanediol product, has a very broad molecular weight distribution and a viscosity which is too high to allow successful casting. With neopentyl glycol in place of 2-methyl-1,3-propanediol, the reaction time is not extended as much as with propylene glycol, the first stage taking 18 hours at 215° C. with nitrogen sparging, an increase of 50%. However, the second stage was extraordinarily slow, and the final product was exceptionally insoluble in styrene. Hence, it cannot be used in conventional UPR/styrene blends.

An improvement in the two stage process may be effected by the initial use of a molar ratio of 2-methyl-1,3-propanediol to saturated dicarboxylic acid of about 1.5:1, preferably within the range of 1.3:1 to 1.7:1. At the range of 1.5:1, a product containing only 3 weight percent unreacted 2-methyl-1,3-propanediol can be prepared. This intermediate product may be separated and stored for further reaction for form a UPR, but is preferably reacted immediately with sufficient further reactants in approximately a 2.1:1:1 ratio as previously described. In contrast, if 2-methyl-1,3-propanediol and terephthalic acid, for example, are reacted in a 2:1 ratio, the product contains some 15 % unreacted 2-methyl-1,3-propanediol which must be removed by distillation to prepare products containing equimolar portions of difunctional acids, thus considerably increasing costs.

The products of the subject invention may also be produced in a single stage procedure, ordinarily involving a single reaction vessel, although the reactor contents could be transferred to a second vessel or produced semi-continuously (semi-batch). All these are termed herein a "one pot, one stage" procedure. Surprisingly, the one stage procedure cannot be used to prepare an "all-terephthalate"

resin. At least 50 mol percent of aromatic dicarboxylic acid monomers must be an aromatic dicarboxylic acid other than terephthalic acid, preferably at least 67% (2:1 mol ratio). In the one pot, one stage procedure, all ingredients are added at the same time to the reactor, preferably in a 2.1:1:1 ratio of 2-methyl-1,3-propanediol to saturated acid to unsaturated acid. However, ratios of 1.8–2.4:0.5–1.5:1.5–0.5 are also useful, more preferably 1.9–2.2:0.7–1.3:1.3–0.7. The "non-terephthalate" saturated acid is preferably isophthalic acid.

In a typical preparation, the ingredients are mixed in the reactor, glycol preferably first, and the temperature increased to the point where the maleic anhydride/2-methyl-1,3-propanediol reaction begins, for example 80° C. Following the expected exotherm, the temperature is heated to a higher temperature with nitrogen sparging to effect polycondensation. Isomerization of maleate to fumarate takes place more efficiently at higher temperatures, and thus temperatures in the range of 200° C. to 240° C., preferably 210–220° C. are preferably maintained until the desired degree of isomerization is effected. The product, like that of the one pot, two stage reaction previously described, can be diluted with styrene following addition of polymerization inhibitor, filtered, and further diluted to any degree desired. Surprisingly, the product demonstrates excellent cured resin properties.

The UPR of the present invention generally have weight average molecular weights in excess of 3,000 Daltons (Da), more preferably greater than 4,000 Da, yet more preferably greater than 5,000 Da, and most preferably in the range of about 5,000 to about 12,000 Da. Higher molecular weights are possible so long as resin viscosity is suitable for the intended application.

Having generally described this invention, a further understanding can be obtained by reference to certain specific examples which are provided herein for purposes of illustration only and are not intended to be limiting unless otherwise specified.

EXPERIMENTAL PROCEDURE: ONE-POT/TWO-STAGE PROCEDURE

Example 1

2.1/1/1 Molar-MP Diol/TPA/Maleic Anhydride

A 3L resin-kettle is charged with 756g (8.4 mol) of 2-methyl 1,3-propanediol, followed by the addition of 664g (4.0 mol) of terephthalic acid. This sequence of addition is chosen to prevent any build-up of solid acid clumps from forming on the kettle bottom. The top is secured and the kettle fitted with a metal paddle-stirrer, thermocouple, condenser, and a nitrogen tube, suitable for either "sparging" or "blanketing".

The resultant slurry is heated to 220° C. by means of a temperature-controlled heating mantle. Production of water is visible when flask contents reach approximately 195° C. After approximately 8 hours at 220° C., the initial slurry converts to a clear solution. After heating for a total of 12 hours the resultant Acid Number of this solution is 19. Analysis of the water produced via esterification reveals that less than 1% of the initial charge of MD Diol is lost in the collection of water overhead.

At this point heating is halted and flask contents allowed to air cool to 80° C. A glass stopper on the lid is removed and 388 g (4.0 mol) of pulverized maleic anhydride added. After the temperature of the initial exothermic reaction subsides, the contents of the flask are heated to a constant temperature of 220° C. It is preferable to only "blanket" the reaction mixture with nitrogen during the second stage. Water production at this point is preferably minimized to allow enough time for thermal isomerization of maleic unsaturation to fumaric unsaturation without excessive build-up of molecular weight. After twelve hours at 220° C. the molecular weight and fumaric concentration targets are met at a final Acid Number of approximately 20–25.

The resultant "turbid" reaction mixture is cooled at approximately 130° C., followed by the addition of a free radical inhibitor. The resin is cut with 30% styrene, passed through a fine-mesh paint filter, and collected in a glass jar. This resin is now ready to be diluted to any desired styrene concentration and cast and cured into specimens for physical property testing.

Comparative Example C1

2.1/1/1 Molar-PG/TPA/Maleic Anhydride

Following an identical procedure as described above, propylene glycol is substituted for MP Diol in the resin stoichiometry in a catalyst free system at ambient pressure. The time required to complete the first-stage is approximately 45 hours with nitrogen sparging at 185° C. The second-stage is equally difficult. After heating in the temperature range of 210–225° C. for approximately 50 hours, a high fumaric content resin (>90% of total unsaturation) was obtained. However, the molecular weight distribution was too broad and final resin viscosity too high to allow for casting.

Comparative Example C2

2.1/1/1 Molar-Neopentyl Glycol/TPA/Maleic Anhydride

Following an identical procedure as described above, neopentyl glycol is substituted for MP Diol in the resin stoichiometry in a catalyst free system at ambient pressure. The time required to complete the first-stage is 18 hours at 215° C. with nitrogen sparging. The second-stage proves to be extremely difficult to conduct. The reaction rate is noticeably slower than when compared to MP Diol. A useable final product was impossible to obtain due to the extreme insolubility of the final product in styrene. Therefore, this material was discarded.

Comparative Example C3

2.1/1/1 Molar-Diethylene Glycol/TPA/Maleic Anhydride

Resin preparation using the above commercially available di-primary glycol was hampered due to the crystalline nature of the final product. However, one resin formulation was successfully obtained at the above stoichiometry. Castings made from the final product exhibited extremely high elongation values (>5%), but with low heat distortion temperatures. Such properties are not conducive to commercial use.

One-Pot/One-Stage Procedure

Example 2

2.1/1/1 Molar-MP Diol/IPA/Maleic Anhydride

A 3L resin-kettle is charged with 756 g (8.4 mol) of 2-methyl-1,3-propanediol, 664 g (4.0 mol) of isophthalic acid, and 392 g (4.0 mol) of maleic anhydride. The top is secured and the kettle fitted with a metal paddle-stirrer, thermocouple, condenser, and a nitrogen tube, suitable for either "sparging" or "blanketing".

The temperature of the resultant slurry is carefully increased and maintained at 80° C., allowing the maleic anhydride to liquefy and react. After the temperature of the initial exothermic reaction had subsided, the contents of the flask are heated to a constant temperature of 180° C. for 8 hours. $^1$H-NMR analysis indicates that conversion of maleic to fumaric at this temperature was proceeding at too slow a rate. Therefore, the temperature of the reaction is increased to 215° C. After 5 additional hours of run time at this temperature, $^1$H-NMR and GPC analysis indicate that the target molecular weight and fumaric concentrations have been achieved.

The resultant clear reaction mixture was cooled at approximately 130° C. followed by the addition of a radical inhibitor. The resin was the cut to 30% styrene, passed through a fine-mesh paint filter and collected in a glass jar. This resin is now ready to be diluted to any desired styrene concentration and cast and cured into specimens for physical property testing.

Several resins are made by the above processes and their physicochemical properties noted. All the syntheses are two-stage processes. The results are presented below in Table 1:

while substantially maintaining modulus and strength, in some cases having improved strength. Note that the high terephthalate content resins exhibit high heat distortion temperatures (HDT) while maintaining higher elongation.

Having now fully described the invention, it will be apparent to one of ordinary skill in the art that many changes and modifications can be made thereto without departing from the spirit or scope of the invention as set forth herein. In the claims, process steps may occur in any order unless otherwise indicated.

What is claimed is:

1. A process for the catalyst-free preparation of terephthalate-based unsaturated polyester resins, said process comprising reacting:

A) a saturated dicarboxylic acid component comprising minimally 75 mol percent of saturated aromatic dicarboxylic acids or esterifiable or transesterifiable derivatives thereof, terephthalic acid or an esterifiable or transesterifiable derivative thereof comprising minimally 25 mol percent of said saturated dicarboxylic acid component;

TABLE 1

| Resin | Ratio[1] MPD-IPA-TPA-MA | Final Acid # | $M_w/M_n$ | Fumarate % | Viscosity In Styrene | | |
|---|---|---|---|---|---|---|---|
| | | | | | 30% Styrene | 40% Styrene | 50% Styrene |
| 8007 | 2.1-1.00-0.00-1.0 | 24 | 5077/1874 | 98 | 3720 | 525 | 123 |
| 8003 | 2.1-0.75-0.25-1.0 | 11 | 4943/2052 | 88 | 1670 | 296 | 81 |
| 8005 | 2.1-0.33-0.67-1.0 | 18 | 8624/2950 | 92 | 5780 | 798 | 204 |
| 8001 | 2.1-0.00-1.00-1.0 | 19 | 7318/2608 | 96 | 26940 | 2460 | 466 |

[1]MPD is 2-methyl-1,3-propanediol, IPA is isophthalic acid, TPA is terephthalic acid, and MA is maleic anhydride.

Properties for clear cast re sin s from 35 weight percent styrene-containing casting resins based on the above resins and a comparative standard resin prepared from isophthalic acid, propylene glycol, and maleic anhydride are given below.

TABLE 2

| | | Tensile | | | |
|---|---|---|---|---|---|
| Resin - % Styrene | HDT ° C. | Strength Ksi/Mpa | Modulus Ksi/mpa | Elongation % | Water Uptake (7 day-100° C.) |
| Iso/PG-STD | 102 | 9500 | 600 | 1.9 | Not Measured |
| 8007 | 80 | 11000 | 540 | 2.6 | 1.74 |
| 8003 | 81 | 11000 | 510 | 3.2 | 1.26 |
| 8005 | 93 | 10600 | 500 | 3.0 | 1.35 |
| 8001 | 102 | 10300 | 430 | 3.2 | 1.22 |

Properties for clear cast resins from 45 weight percent styrene casting compositions are given below in Table 3.

TABLE 3

| | | Tensile | | | |
|---|---|---|---|---|---|
| Resin - % Styrene | HDT ° C. | Strength Ksi/Mpa | Modulus Ksi/mpa | Elongation % | Water Uptake (7 day-100° C.) |
| Iso/PG-STD | 116 | 10600 | 530 | 2.5 | 1.03 |
| 8007 | 90 | 11900 | 540 | 2.8 | 1.27 |
| 8003 | 87 | 11400 | 500 | 4.0 | 0.76 |
| 8005 | 96 | 11600 | 500 | 3.6 | 1.40 |
| 8001 | 109 | 9100 | 450 | 2.5 | 1.12 |

Note that all the resins prepared from 2-methyl-1,3-propanediol have higher elongation than the standard resin, B) at least one unsaturated dicarboxylic acid or esterifiable or transesterifiable derivative thereof; and C) a glycol component containing at least 65 mol percent 2-methyl-1,3-propane diol based on total mol of glycol, at a temperature in excess of 200° C. with an inert gas sparge at a flow rate effective to remove water of esterification, the ratio of (A+B) to (C) such that an unsaturated polyester is obtained having a weight average molecular weight $M_w$ greater than 300 Da, said reacting taking place in the absence of a catalytically effective amount of a metal esterification catalyst; and optionally, D) adding one or more unsaturated vinyl monomers.

2. The process of claim 1, wherein at least one of said at least one saturated dicarboxylic acids or esterifiable or transesterifiable derivatives thereof other than terephthalic acid is selected from the group consisting of naphthalene dicarboxylic acid, phthalic acid, isophthalic acid, and the esterifiable or transesterifiable derivatives and mixtures thereof, and one of said at least one unsaturated dicarboxylic acid comprises maleic acid, fumaric acid, an esterifiable or transesterifiable derivative of maleic or fumaric acid, or the carboxylic acid-functional oligomeric reaction product of an aliphatic diol with an excess of maleic acid or fumaric acid or their esterifiable or transesterifiable derivatives, said oligomeric reaction product having a weight average molecular weight below 500 Da.

3. The process of claim 1, wherein a two stage reaction is employed, said process comprising:

1) reacting, in a first stage, said glycol component C) and said saturated dicarboxylic acid component A) to form a hydroxyl-functional ester product; and 2) reacting, in a second stage, said hydroxyl-functional ester product with said unsaturated dicarboxylic acid or esterifiable or transesterifiable derivative thereof B).

4. The process of claim 2, wherein a two stage reaction is employed, said process comprising:
1) reacting, in a first stage, said glycol component C) and said saturated dicarboxylic acid component A) to form a hydroxyl-functional ester product; and
2) reacting, in a second stage, said hydroxyl-functional ester product with said unsaturated dicarboxylic acid or esterifiable or transesterifiable derivative thereof B).

5. The process of claim 3, wherein said saturated dicarboxylic acid other than terephthalic acid comprises at least one dicarboxylic acid selected from the group consisting of phthalic acid and isophthalic acid, and their esterifiable or transesterifiable derivatives.

6. The process of claim 3, wherein said glycol component B) consists essentially of 2-methyl-1,3-propanediol.

7. The process of claim 5, wherein said glycol component B) consists essentially of 2-methyl-1,3-propanediol.

8. The process of claim 3, wherein said unsaturated dicarboxylic acid or esterifiable or transesterifiable derivative thereof comprises maleic anhydride, or the fumarate isomerized reaction product of a molar excess of maleic acid or maleic anhydride with an aliphatic glycol having a weight average molecular weight below 500 Da.

9. The process of claim 5, wherein said unsaturated dicarboxylic acid or esterifiable or transesterifiable derivative thereof comprises maleic anhydride, or the fumarate isomerized reaction product of a molar excess of maleic acid or maleic anhydride with an aliphatic glycol having a weight average molecular weight below 500 Da.

10. The process of claim 6, wherein said unsaturated dicarboxylic acid or esterifiable or transesterifiable derivative thereof comprises maleic anhydride, or the fumarate isomerized reaction product of a molar excess of maleic acid or maleic anhydride with an aliphatic glycol having a weight average molecular weight below 500 Da.

11. The process of claim 1, wherein at least a portion of said reacting takes place at a temperature of 210° C. or more.

12. The process of claim 1, wherein said reactor is not pressurized to more than 2 psig.

13. The process of claim 3, wherein said saturated dicarboxylic acid comprises isophthalic acid, terephthalic acid, or a mixture thereof; said glycol component (C) comprises in excess of 90 mol percent 2-methyl-1,3-propanediol; and said unsaturated dicarboxylic acid or esterifiable or transesterifiable derivative comprises maleic anhydride, or the bis (fumarate) ester of a $C_{2-8}$ aliphatic glycol; said glycol component (C) present in a ratio of 1–1.2:1 based on total mol of dicarboxylic acids or esterifiable or transesterifiable derivative thereof.

14. The process of claim 13, wherein said reacting (1) takes place at a ratio of glycol (C) to saturated dicarboxylic acid (A) of 1.3 to 1.7:1.

15. The process of claim 13, wherein said reacting (1) takes place at a ratio of glycol (C) to saturated dicarboxylic acid (A) of 1.5:1.

16. An esterification-catalyst-free unsaturated molding resin, comprising:
an unsaturated polyester resin produced by the process of claim 1 containing an unsaturated monomer in which said unsaturated polyester resin is soluble.

17. The molding resin of claim 16 wherein said unsaturated vinyl monomer is selected from the group consisting of styrene, α-methylstyrene, and vinyltoluene.

18. An esterification catalyst-free unsaturated molding resin, comprising:
an unsaturated polyester resin produced by the process of claim 2 containing an unsaturated vinyl monomer in which said unsaturated polyester resin is soluble.

19. The molding resin of claim 18 wherein said unsaturated monomer is selected from the group consisting of styrene, α-methylstyrene, and vinyltoluene.

20. An esterification-catalyst-free unsaturated molding resin, comprising:
an unsaturated polyester resin produced by the process of claim 3 containing an unsaturated vinyl monomer in which said unsaturated polyester resin is soluble.

21. The molding resin of claim 20 wherein said unsaturated monomer is selected from the group consisting of styrene, 2-methylstrene, and vinyltolrene.

22. An esterification catalyst-free unsaturated molding resin, comprising:
an unsaturated polyester resin produced by the process of claim 13 containing an un saturated monomer in which said unsaturated polyester resin is soluble.

23. The molding resin of claim 22 wherein said unsaturated monomer is selected from the group consisting of styrene, 2-methyistrene, and vinyltolrene.

24. A process for preparing an unsaturated polyester resin exhibiting enhanced solubility in styrene, said process having a reduced cycle time, said process comprising reacting:
A) a saturated dicarboxylic acid component consists essentially of terephthalic acid or esterifiable or transesterifiable derivative thereof,
B) an unsaturated dicarboxylic acid comprising in major part maleic acid or esterifiable or transesterifiable derivative thereof; and
C) a glycol component comprising at least 65 mol percent 2-methyl-1,3-propane diol based on total mol of glycol;
wherein at least a portion of said reaction takes place at a temperature above 200° C. in the presence of a sparge of inert gas, optionally in the presence of a catalyst which is effective to increase the rate of polyesterification; wherein the ratio of component (C) to components (A+B) is in the range of 1.8 to 2.4, and optionally adding at least one vinyl monomer.

25. The process of claim 24, wherein the ratio of saturated dicarboxylic acid or esterifiable or transesterifiable derivative thereof to unsaturated dicarboxylic acid or esterifiable or transesterifiable derivative thereof is from about 0.5–1.5:1.5–0.5.

26. The process of claim 24, wherein said glycol component (C) consists essentially of 2-methyl-1,3-propane diol.

27. The process of claim 24, wherein the reaction is conducted at a pressure of from 13psig to 30 psig.

28. A molding resin, comprising the polyester produced by the process of claim 24 dissolved in an unsaturated monomer comprising at least one of styrene, vinyltoluene, or α-methylstyrene.

29. The process of claim 24 wherein no catalyst is employed.

30. The process of claim 24 wherein components A), B), and C) are reacted simultaneously.

31. The process of claim 1 wherein components A), B), and C) are reacted simultaneously.

* * * * *

UNITED STATES PATENT AND TRADEMARK OFFICE
CERTIFICATE OF CORRECTION

PATENT NO.   : 6,414,085 B1
DATED        : July 2, 2002
INVENTOR(S)  : Lawrence J. Karas et al.

It is certified that error appears in the above-identified patent and that said Letters Patent is hereby corrected as shown below:

Column 10,
Line 43, "300 Da" should read -- 3000 Da --.

Column 12,
Line 15, "2-methylstrene" should read -- 2-methylstyrene --.
Line 15, "vinyltolrene" should read -- vinyltoluene --.
Line 23, "2-methyistrene" should read -- 2-methylstyrene --.
Line 23, "vinyltolrene" should read -- vinyltoluene --.

Signed and Sealed this

Twenty-eighth Day of January, 2003

JAMES E. ROGAN
*Director of the United States Patent and Trademark Office*